(12) United States Patent
Shih et al.

(10) Patent No.: US 11,073,841 B2
(45) Date of Patent: Jul. 27, 2021

(54) METHODS AND SYSTEMS FOR LAUNCHING AN UNMANNED AERIAL VEHICLE

(71) Applicant: GEOSAT Aerospace & Technology, Tainan (TW)

(72) Inventors: Lung-Shun Shih, Huatan Township (TW); Fu-Kai Yang, Tainan (TW); Yi-Feng Cheng, Tainan (TW); Chao-Wen Fu, Changhua (TW); Meng-Yan Shen, Taichung (TW)

(73) Assignee: GEOSAT AEROSPACE & TECHNOLOGY, Tainan (TW)

( * ) Notice: Subject to any disclaimer, the term of this patent is extended or adjusted under 35 U.S.C. 154(b) by 23 days.

(21) Appl. No.: 16/243,019

(22) Filed: Jan. 8, 2019

(65) Prior Publication Data
US 2019/0220038 A1    Jul. 18, 2019

Related U.S. Application Data

(60) Provisional application No. 62/614,925, filed on Jan. 8, 2018.

(51) Int. Cl.
*G05D 1/06* (2006.01)
*G05D 1/08* (2006.01)
(Continued)

(52) U.S. Cl.
CPC ............ *G05D 1/0661* (2013.01); *B64C 9/00* (2013.01); *B64C 39/024* (2013.01); *G05D 1/085* (2013.01);
(Continued)

(58) Field of Classification Search
CPC ......... B64C 39/024; B64C 39/02; B64C 5/06; B64C 27/08; B64C 9/00; B64C 2009/005;
(Continued)

(56) References Cited

U.S. PATENT DOCUMENTS

| 9,969,504 B1* | 5/2018 | Davis .................... B64F 1/06 |
| 2012/0205488 A1* | 8/2012 | Powell .................. B64C 39/024 |
| | | 244/63 |

(Continued)

FOREIGN PATENT DOCUMENTS

| CN | 201000576 Y | 1/2008 |
| CN | 105292494 A | 2/2016 |

(Continued)

OTHER PUBLICATIONS

International Search Report and Written Opinion issued in related PCT Application No. PCT/CN2019/070911, dated Mar. 21, 2019 (8 pgs.).

(Continued)

*Primary Examiner* — Behrang Badii
(74) *Attorney, Agent, or Firm* — Finnegan, Henderson, Farabow, Garrett & Dunner LLP (57) ABSTRACT

The present application provides methods and systems for launching an unmanned aerial vehicle (UAV). An exemplary system for launching a UAV includes a detector configured to detect acceleration of the UAV in a launch mode. The exemplary system may also include a memory storing instructions and a processor configured to execute the instructions to cause the system to: obtain a signal configured to notify the UAV to enter the launch mode, determine whether the acceleration of the UAV satisfies a condition corresponding to threshold acceleration in the launch mode, and responsive to the determination that the acceleration of the UAV satisfies the condition, turn on a motor of the UAV.

18 Claims, 9 Drawing Sheets

(51) Int. Cl.
*B64C 9/00* (2006.01)
*B64C 39/02* (2006.01)

(52) U.S. Cl.
CPC .. *B64C 2009/005* (2013.01); *B64C 2201/028* (2013.01); *B64C 2201/04* (2013.01); *B64C 2201/08* (2013.01); *B64C 2201/084* (2013.01); *B64C 2201/104* (2013.01); *B64C 2201/12* (2013.01); *B64C 2201/146* (2013.01)

(58) Field of Classification Search
CPC .......... B64C 2201/028; B64C 2201/04; B64C 2201/08; B64C 2201/084; B64C 2201/104; B64C 2201/12; B64C 2201/146; G05D 1/0011; G05D 1/0669; G05D 1/042; G05D 1/0808; G05D 1/101; G05D 1/0094; G05D 1/0661; G05D 1/085; G05D 1/0016; B64F 1/04; B64F 1/06; B63G 3/04; B63G 8/30; B64D 1/02
See application file for complete search history.

(56) References Cited

U.S. PATENT DOCUMENTS

| | | | |
|---|---|---|---|
| 2016/0340049 A1 | 11/2016 | Ferreyra et al. | |
| 2017/0057635 A1* | 3/2017 | Strayer | B64C 39/024 |
| 2017/0158338 A1 | 6/2017 | Sweeny et al. | |
| 2017/0197731 A1* | 7/2017 | Yang | G05D 1/0669 |
| 2017/0251193 A1 | 8/2017 | Zhou et al. | |
| 2018/0039271 A1 | 2/2018 | Rimoux et al. | |
| 2018/0067498 A1* | 3/2018 | Wang | G05D 1/0669 |
| 2018/0218533 A1 | 8/2018 | Millin et al. | |
| 2019/0060679 A1 | 2/2019 | Kim et al. | |
| 2020/0070999 A1 | 3/2020 | Dubois et al. | |

FOREIGN PATENT DOCUMENTS

| | | |
|---|---|---|
| CN | 105366059 A | 3/2016 |
| CN | 105539874 A | 5/2016 |
| CN | 105730707 A | 7/2016 |
| CN | 105867413 A | 8/2016 |
| CN | 105892289 A | 8/2016 |
| CN | 106227234 A | 12/2016 |
| CN | 106502270 A | 3/2017 |
| CN | 106716281 A | 5/2017 |
| CN | 106873607 A | 6/2017 |
| EP | 2 906 468 B1 | 12/2017 |
| WO | WO 2007/034468 A1 | 3/2007 |
| WO | WO 2016/198809 A1 | 12/2016 |

OTHER PUBLICATIONS

International Search Report and Written Opinion issued in related PCT Application No. PCT/CN2019/070909, dated Mar. 22, 2019 (8 pgs.).

International Preliminary Report on Patentability in related PCT Application No. PCT/CN2019/070909, dated Apr. 27, 2020 (6 pgs.).

* cited by examiner

METHODS AND SYSTEMS FOR LAUNCHING AN UNMANNED AERIAL VEHICLE

CROSS REFERENCE TO RELATED APPLICATION

The present application claims the benefit of priority to U.S. Provisional Application No. 62/614,925, filed on Jan. 8, 2018, the entire content of which is incorporated herein by reference.

TECHNICAL FIELD

The present application relates to unmanned aerial vehicles (UAVs), and more particularly, to methods and systems for launching UAVs.

BACKGROUND

In a conventional UAV, it may be necessary to turn on a motor of the UAV before the UAV launches. The motor can spin a propeller to a certain speed for taking off. However, when the UAV is launched by a user, the spinning propeller may be dangerous for the user. For example, when the user launches the UAV by hand, the spinning propeller may injure the user. It would be desirable to have new methods and systems for launching the UAV in a safe way.

SUMMARY

Embodiments of the present disclosure provide improved methods and systems for launching a UAV.

In at least one embodiment, systems for launching a UAV include a detector configured to detect acceleration of the UAV in a launch mode. Exemplary systems also include a memory storing instructions and a processor configured to execute the instructions to cause the system to obtain a signal configured to notify the UAV to enter the launch mode, determine whether the acceleration of the UAV satisfies a condition corresponding to threshold acceleration in the launch mode, and responsive to the determination that the acceleration of the UAV satisfies the condition, turn on a motor of the UAV.

Embodiments consistent with the present disclosure may comprise at least a non-transitory computer-readable medium storing a set of instructions that are executable by one or more processors of an apparatus to cause the apparatus to perform a method for launching a UAV. At least one of exemplary methods includes the steps of obtaining a signal configured to notify the UAV to enter a launch mode, detecting acceleration of the UAV in the launch mode, determining whether the acceleration of the UAV satisfies a condition corresponding to threshold acceleration in the launch mode, and responsive to the determination that the acceleration of the UAV satisfies the condition, turning on a motor of the UAV.

Also disclosed herein are methods for launching an unmanned aerial vehicle (UAV). Exemplary methods include obtaining a signal configured to notify the UAV to enter a launch mode, detecting an acceleration of the UAV in the launch mode, determining whether the acceleration of the UAV is equal to or greater than a threshold in the launch mode, and responsive to a determination that the acceleration of the UAV is equal to or greater than the threshold in the launch mode, turning on a motor of the UAV.

It is to be understood that the foregoing general description and the following detailed description are exemplary and explanatory only, and are not restrictive of the inventions, as claimed.

BRIEF DESCRIPTION OF THE DRAWINGS

Reference will now be made to the accompanying drawings showing exemplary embodiments of the inventions disclosed herein. In the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
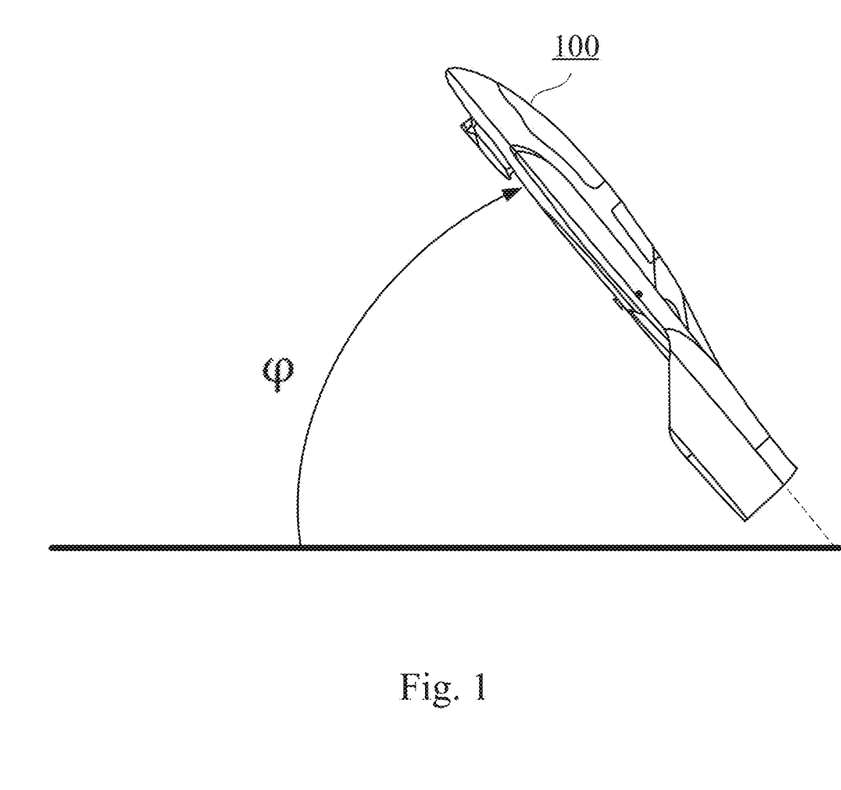
FIG. 1 illustrates a schematic diagram of an exemplary method for unlocking a UAV to enter a launch mode, according to some embodiments of the present disclosure.

FIG. 1 illustrates a schematic diagram of an exemplary method for unlocking a UAV 100 to enter a launch mode, according to some embodiments of the present disclosure. A user may unlock a motor of UAV 100 by tilting up UAV 100 over a degree φ to activate UAV 100 in a take-off mode, i.e., a launch mode. That is, when the user tilts up UAV 100 over the degree φ, UAV 100 detects this operation as receiving a signal configured to notify UAV 100 to enter the launch mode. Alternatively, the user can unlock the motor of UAV 100 from a GCS system communicatively connecting thereto to activate UAV 100 in the take-off mode. For example, the user may input an instruction on the GCS to prepare for take-off. The GCS may send a signal for take-off to UAV 100 to activate UAV 100 in the take-off mode. The signal for take-off is configured to notify UAV 100 to enter the launch mode.

Figure 7:
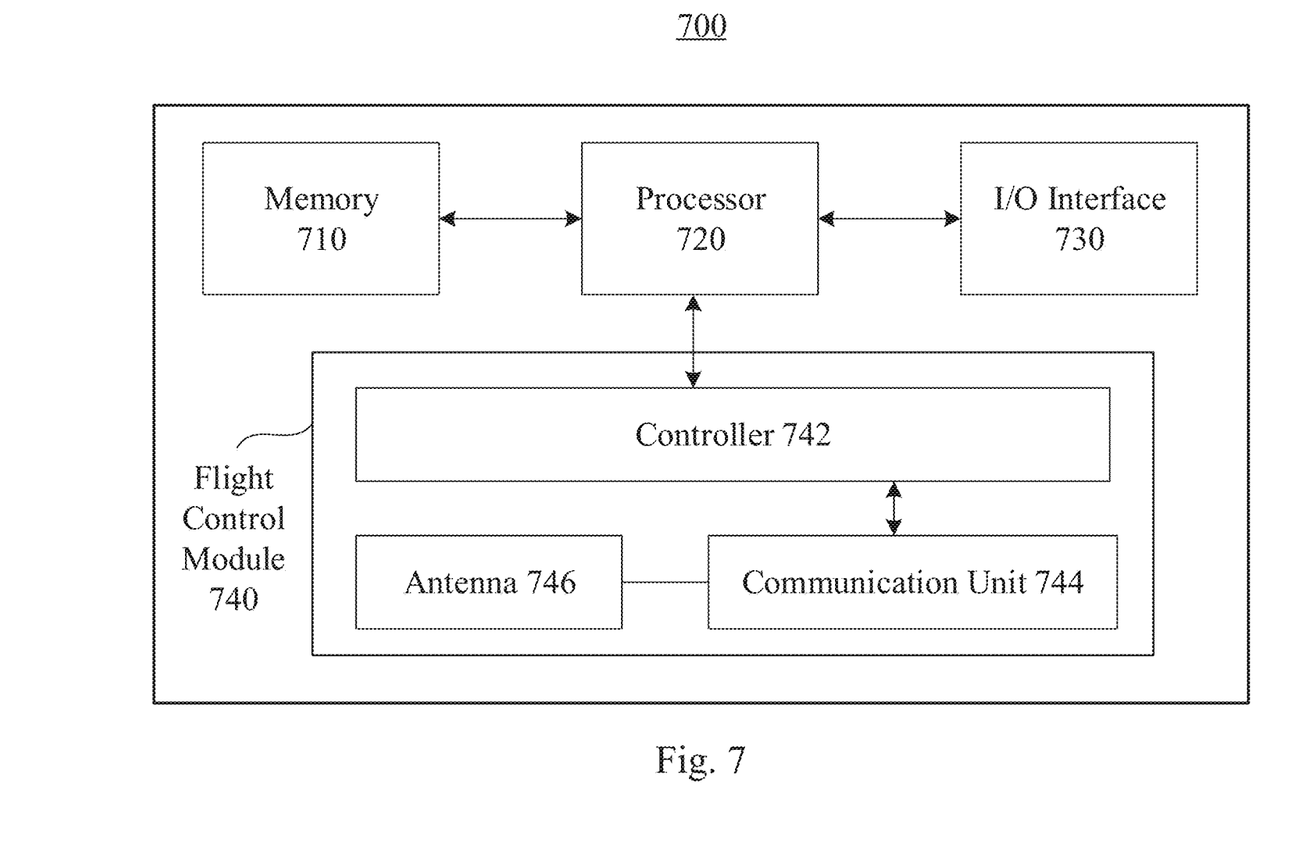
FIG. 7 is a schematic diagram of an exemplary GCS, according to some embodiments of the present disclosure.

As shown in FIG. 7, a system for launching UAV 100 includes a memory storing instructions and a processor configured to execute the instructions to cause the system to obtain a signal configured to notify the UAV to enter the launch mode. For example, the processor of the system can be configured to execute the instructions to cause the system to detect whether UAV 100 is tilted up over an unlock angle, i.e., whether UAV 100 is tilted up over the degree φ. In response to a determination that UAV 100 is tilted up over the unlock angle, the processor of the system is configured to execute the instructions to cause the system to enter the launch mode, as receiving the signal configured to notify UAV 100 to enter the launch mode.

Alternatively, the processor of the system is configured to execute the instructions to cause the system to receive a signal for take-off from a GCS system, where the signal is configured to notify UAV 100 to enter the launch mode. Accordingly, the processor of the system is configured to execute the instructions to cause the system to enter the launch mode.

The degree φ can be, for example, between 50 and 90 degrees. The degree φ can be set at lower degrees among multiple candidates for users to unlock UAV easily. For example, the degree φ can be set at 50 degrees. Alternatively, the degree φ can be set at greater degrees among the multiple candidates to avoid accidental operations that unlock UAV 100. For example, the degree φ can be set at 90 degrees.

In contrast, the user may lock the motor of UAV 100 by tilted down UAV 100 over another angle to de-activate UAV 100 from the take-off mode (i.e., the launch mode). The angle can be, for example, between 50 and 90 degrees. When UAV 100 is not in the take-off mode or the launch mode, UAV 100 cannot be launched.

When UAV 100 is in the take-off mode (i.e., the launch mode), UAV 100 is ready to launch. UAV 100 in the launch mode can be launched by hand or ejection from a launch rack. For user safety, UAV 100 may not turn on a motor of UAV 100 that spins a propeller of UAV 100. Thus, the user need not to worry about a spinning propeller of UAV 100 and can prepare to launch UAV 100 by hand or from the launch rack in a safe way.

Figure 2:
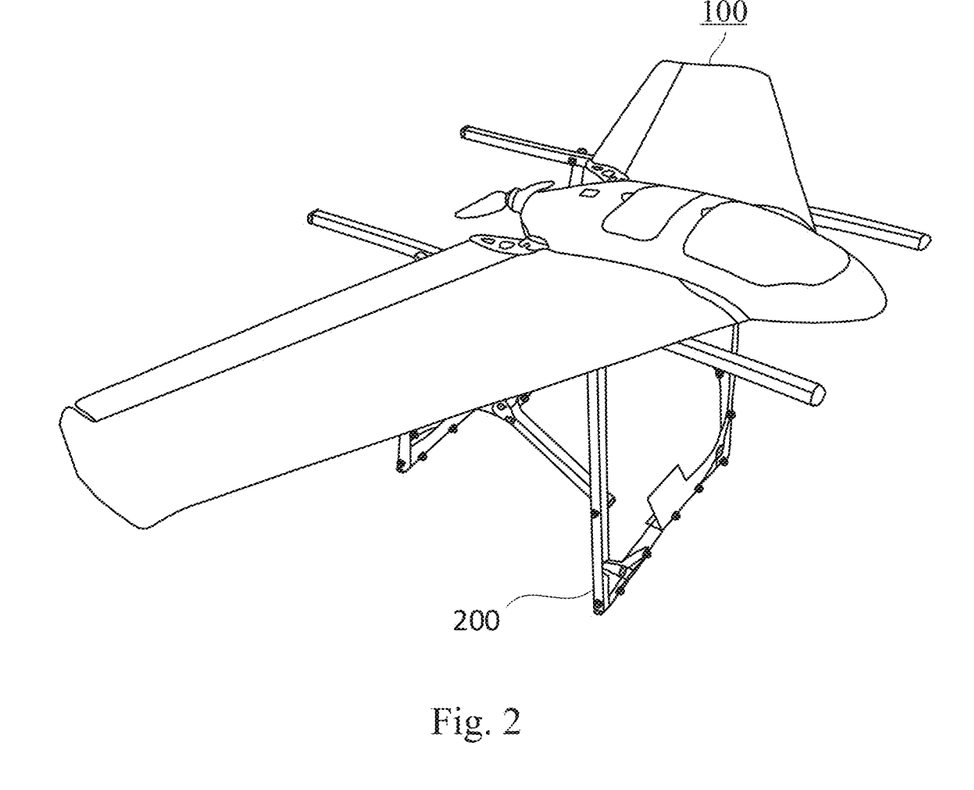
FIG. 2 is a schematic diagram of an exemplary method for launching a UAV from a launch rack, according to some embodiments of the present disclosure.

FIG. 2 is a schematic diagram of an exemplary method for launching UAV 100 from a launch rack 200, according to some embodiments of the present disclosure. As shown in FIG. 2, the user prepares to launch UAV 100 by a launch rack 200. The user can unlock the motor of UAV 100 by tilting up UAV 100 over a degree, e.g., 30 degrees, to activate UAV 100 in the launch mode. The user may then put UAV 100 on launch 200 and prepare to launch UAV 100 from launch rack 200. UAV 100 in the launch mode is ready to launch. For user safety, UAV 100 may be configured not to turn on the motor of UAV 100 that spins the propeller of UAV 100 at this moment. Therefore, the user need not to worry about a spinning propeller of UAV 100 and can prepare to launch UAV 100 from launch rack 200 in a safe way.

Alternatively, the user can unlock the motor of UAV 100 from the GCS system to activate UAV 100 in the launch mode. For example, the user can put UAV 100 on launch 200 first and prepare to launch UAV 100 from launch rack 200.

Then, the user inputs an instruction on the GCS to prepare for take-off. The GCS is configured to send a signal for take-off to UAV 100 to notify UAV 100 to enter the launch mode.

In some embodiments, the user can also unlock the motor of UAV 100 from a GCS system by a remote controller. For example, the user may input an instruction to the remote controller, and the remote controller may send the signal for take-off to UAV 100 to activate UAV 100 in the launch mode. After UAV 100 enters the launch mode, UAV 100 can be launched from launch rack 200. For user safety, UAV 100 may not turn on the motor of UAV 100 that spins the propeller of UAV 100.

Figure 3:
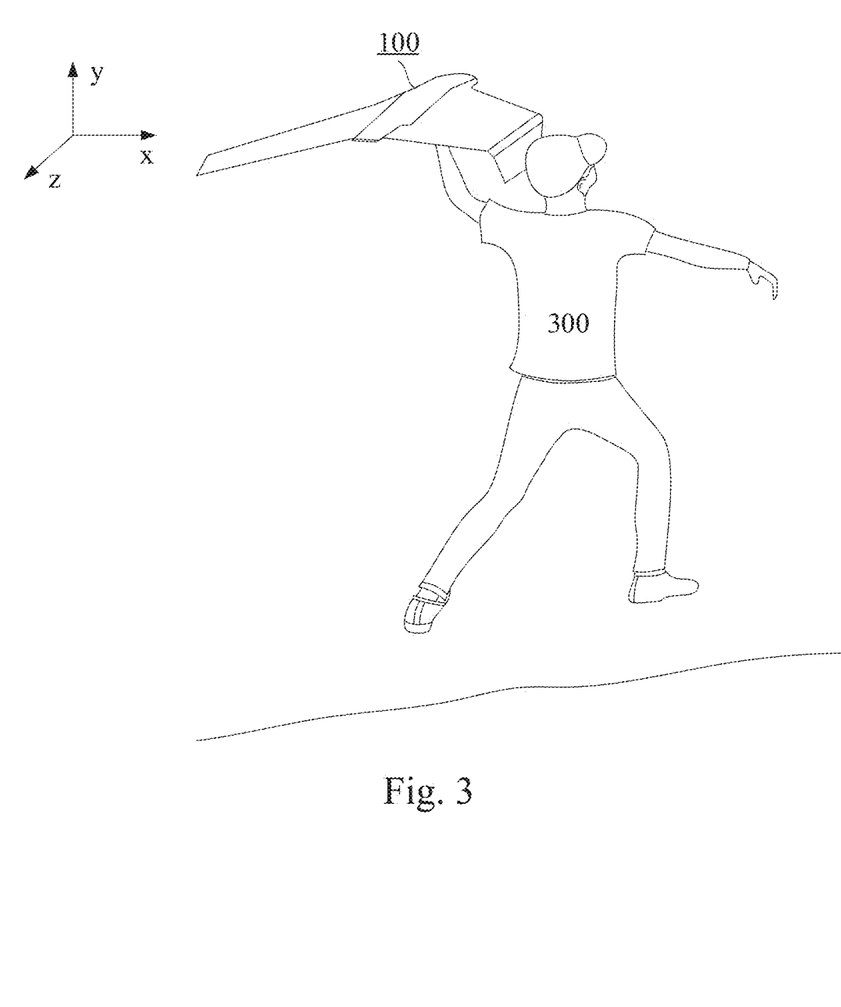
FIG. 3 is a schematic diagram of an exemplary method for hand launching a UAV, according to some embodiments.

FIG. 3 is a schematic diagram of an exemplary method for hand launching a UAV, according to some embodiments of the present disclosure. For example, a user 300 may hand launch UAV 100 after unlocking the motor of UAV 100. As shown in FIG. 3, user 300 throws UAV 100 upward to the air for launching UAV 100. The system for launching UAV 100 may include a detector configured to detect acceleration of UAV 100 in a launch mode. For example, when user 300 throws UAV 100 upward to the air, the detector of the system is configured to detect acceleration of UAV 100 in x, y, and z axes. The acceleration of UAV 100 can be calculated by: $Acc=\sqrt{a_x^2+a_y^2+a_z^2}$, where Acc is summary of acceleration of UAV 100 in x, y, and z axes, and $a_x$, $a_y$, and $a_z$ are acceleration of UAV 100 in x, y, and z axes, respectively. The detector of the system may include, for example, a plurality of accelerometers that measure accelerations in different axes or directions.

The processor of the system may be configured to execute the instructions to cause the system to determine whether the acceleration of UAV 100 satisfies a condition corresponding to threshold acceleration in the launch mode. For example, when the acceleration of UAV 100 is equal to or greater than the threshold acceleration, the system is configured to determine that the condition is satisfied. The threshold acceleration can be, for example, four, five, or six times of gravitation acceleration (g). If Acc≥5 g, the processor of the system is configured to execute the instructions to cause the system to determine that the acceleration of UAV 100 satisfies the condition in the launch mode.

In response to the determination that the acceleration of UAV 100 satisfies the condition, the processor of the system is configured to execute the instructions to cause the system to turn on a motor of UAV 100. The motor of UAV 100 then spins a propeller of UAV 100 to take off. The processor of the system may be configured to execute the instructions to cause the system to turn on the motor of UAV 100 at full throttle to take off. Alternatively, the processor of the system may be configured to execute the instructions to cause the system to turn on the motor of UAV 100 at 80% throttle to take off when UAV 100 carries a light payload.

In some embodiments, the processor of the system is further configured to execute the instructions to cause the system to stabilize attitude of UAV 100 after turning on the motor of the UAV. For example, the processor of the system is configured to execute the instructions to cause the system to adjust two ailerons of UAV 100 to stabilize the attitude of UAV 100 to be balanced and with an elevation angle for climbing upward. The elevation angle can be, for example, between 30 and 45 degrees. In other words, the elevation angle for take off may be equal to or greater than, for example, 30 degrees.

The processor of the system can be configured to execute the instructions to cause the system to adjust two ailerons of UAV 100 with the same amount of extensions to balance UAV 100, and with increment or decrement of the amount of extensions to increase or decrease the elevation angle of UAV 100.

Figure 4:
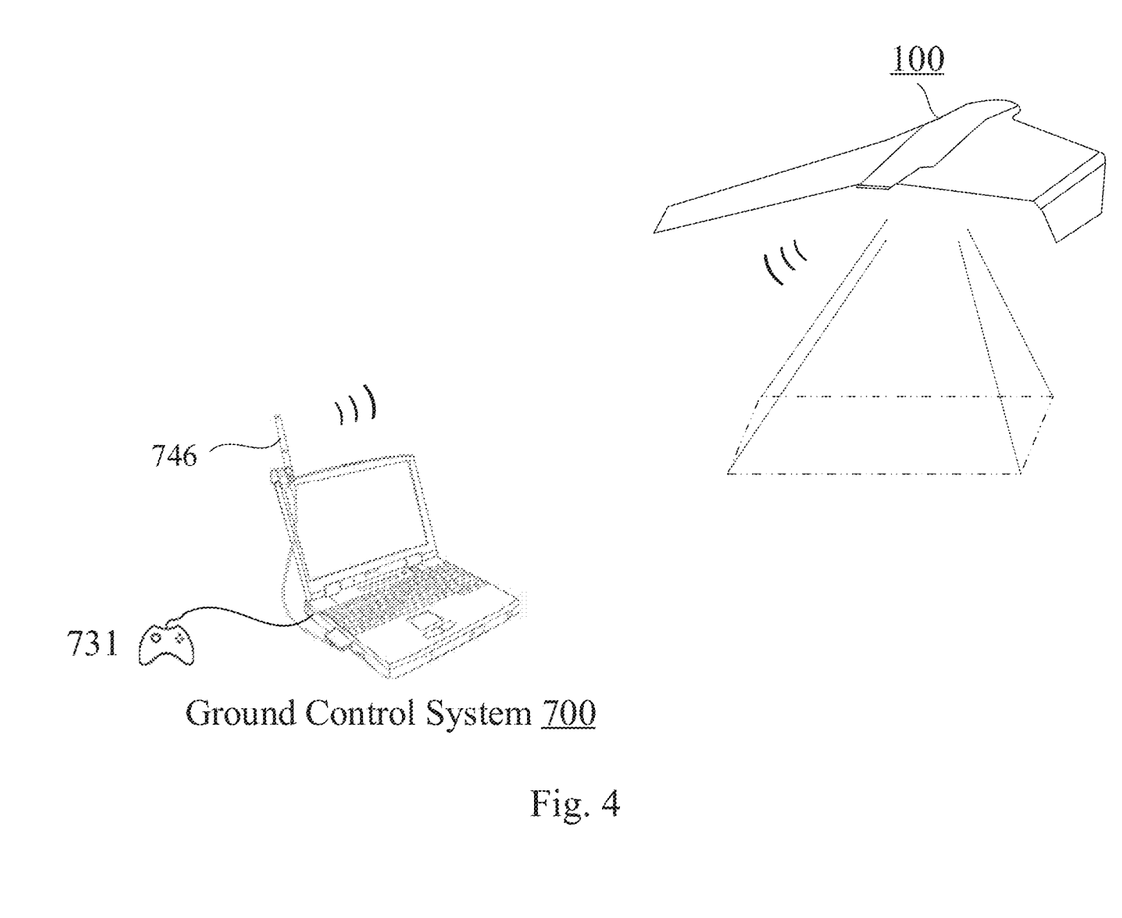
FIG. 4 is a schematic diagram of an exemplary UAV and an exemplary ground control system (GCS) and an exemplary remote controller for controlling the UAV, according to some embodiments of the present disclosure.

FIG. 4 is a schematic diagram of exemplary UAV 100 and an exemplary ground control system (GCS) 700 and an exemplary remote controller 731 for controlling UAV 100, according to some embodiments of the present disclosure. After UAV 100 is launched successfully, user 300 can control UAV 100 through GCS 700 or remote controller 731. GCS 700 can be run on a desktop computer, a laptop, a tablet, or a smartphone. User 300 can input an instruction on GCS 700 to control or set a parameter on UAV 100. After receiving the instruction or the parameter, GCS 700 is configured to transmit a signal through an antenna 746 to UAV 100.

Alternatively, user 300 can use remote controller 731 to manually control UAV 100. For example, user 300 may input an instruction to remote controller 731 to control or set a parameter on UAV 100. After receiving the instruction, remote controller 731 sends a control signal to GCS 700, and GCS 700 then transmits a signal through antenna 746 to UAV 100. Remote controller 731 provides user 300 a direct and responsive input method to interact with GCS 700 and control UAV 100 accordingly.

Figure 5:
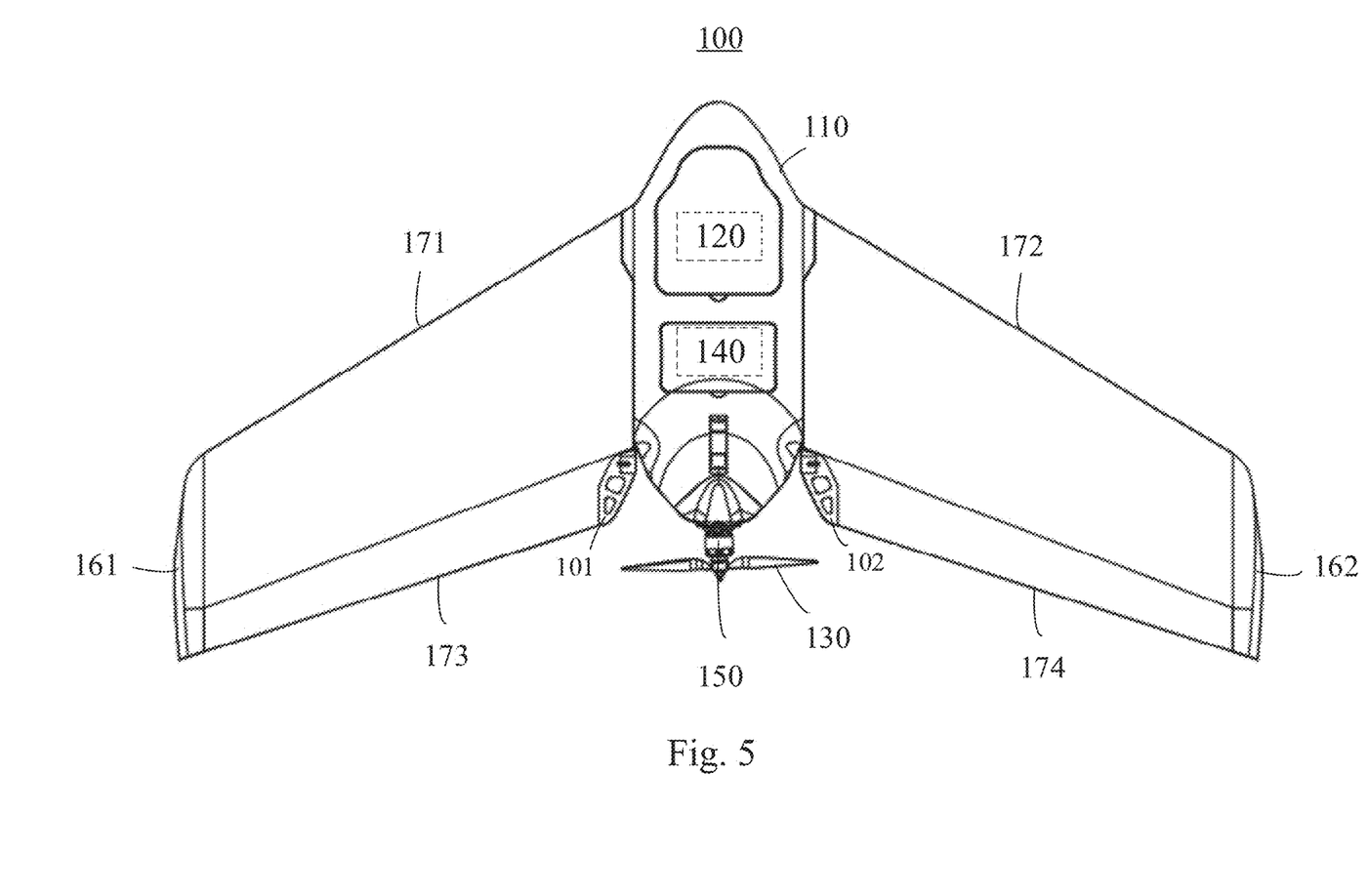
FIG. 5 is a schematic diagram of an exemplary UAV, according to some embodiments of the present disclosure.

FIG. 5 is a schematic diagram of exemplary UAV 100, according to some embodiments of the present disclosure. UAV 100 includes a UAV body assembly 110, a flight control system (FCS) 120, a payload 140, a left wing 171 and a right wing 172, a left aileron 173 and a right aileron 174, a left winglet 161 and a right winglet 162, a left aileron controller 101 and a right aileron controller 102, a motor 150, and a propeller 130. Payload 140 may comprise a camera, a multispectral camera, a thermal infrared camera, or other camera with similar capabilities. FCS 120 is coupled to UAV body assembly 110. Motor 150 is coupled to UAV body assembly 110 at one end and coupled to propeller 130 at the other end. FCS 120 is communicatively connected to motor 150. FCS 120 may be configured to control left aileron 173 and right aileron 174 by servo motors connected to left aileron controller 101 and right aileron controller 102, respectively.

Figure 6:
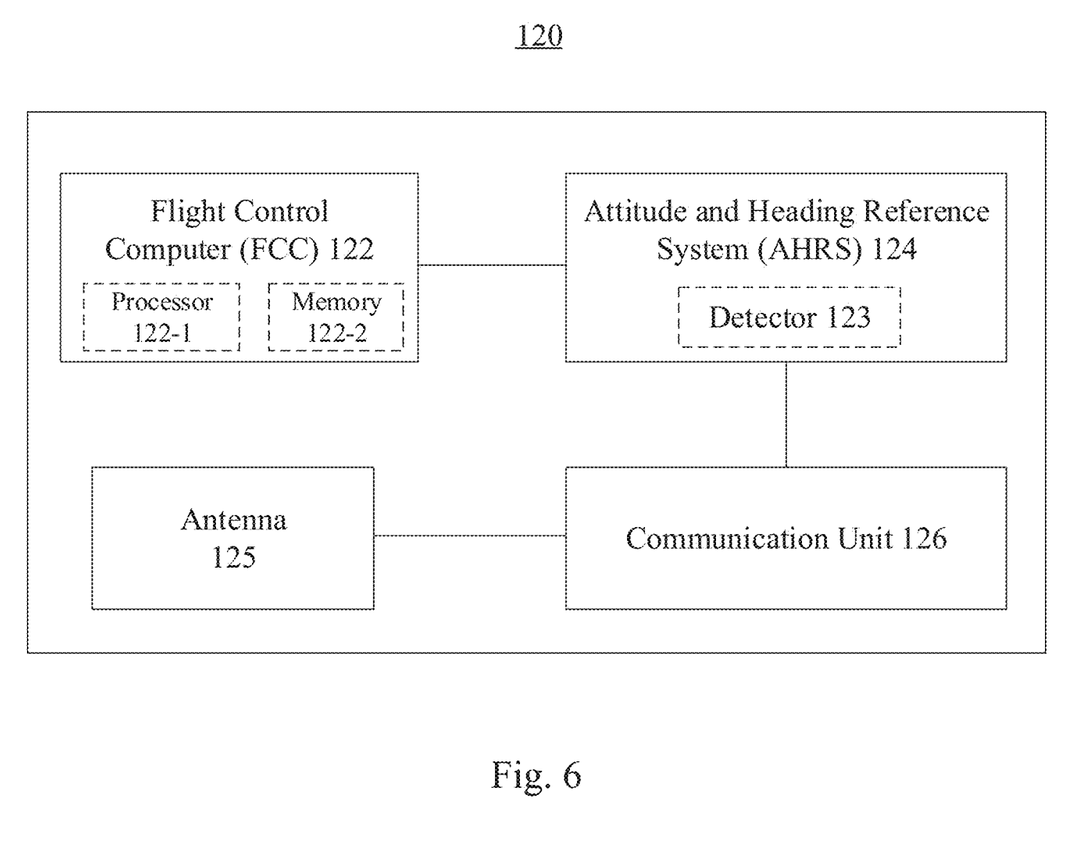
FIG. 6 is a schematic diagram of an exemplary flight control system (FCS) for controlling a UAV, according to some embodiments of the present disclosure.

FIG. 6 is a schematic diagram of an exemplary FCS 120 for controlling UAV 100, according to some embodiments of the present disclosure. As shown in FIG. 6, FCS 120 includes a flight control computer (FCC) 122, an Attitude and Heading Reference System (AHRS) 124, a communication unit 126, an antenna 125 for controlling UAV 100, according to some embodiments of the present disclosure. AHRS 124 includes a detector 123.

FCC 122 includes a processor 122-1 and a memory 122-2 storing instructions. FCC 122 is configured to control UAV 100 for launching. For example, processor 122-1 of FCC 122 can be configured as the processor of the system or UAV 100 in descriptions above for FIGS. 1-4 for launching UAV 100. Memory 122-2 can also be configured as the memory of the system in descriptions of FIGS. 1 and 3 above for launching UAV 100.

In addition, FCC 122 may be configured to control motor 150 to speed up or slow down UAV 100. For example, processor 122-1 is configured to execute the instructions stored in memory 122-2 to cause FCC 122 to control motor 150 at full throttle to speed up. As another example, processor 122-1 can be configured to execute the instructions stored in memory 122-2 to cause FCC 122 to control aileron 173 and 174 to make UAV 100 pitch, roll, or yaw.

AHRS 124 includes detectors or sensors on three axes that provide attitude information for UAV 100, including roll, pitch, and yaw. As shown in FIG. 6, detector 123 of AHRS 124 may include one or multiple sensors that provide the attitude information for UAV 100. These sensors may also be referred to as magnetic, angular rate, and gravity (MARG) sensors, and include either solid-state or microelectromechanical systems (MEMS) gyroscopes, accelerometers, and magnetometers.

For example, detector 123 can include one or more accelerometers that measure acceleration of UAV 100 in x, y, and z axes: $a_x$, $a_y$, and $a_z$, as described above for FIG. 3. Detector 123 may be configured to send the measured acceleration $a_x$, $a_y$, and $a_z$ to FCC 122. Processor 122-1 is configured to execute the instructions to determine whether Acc≥5 g. When Acc≥5 g, processor 122-1 is configured to execute the instructions to cause FCC 122 to determine that the acceleration of UAV 100 satisfies the condition in the launch mode. Processor 122-1 is then configured to execute the instructions to cause FCC 122 to turn on motor 150 at full throttle for takeoff.

AHRS 124 can also include an on-board processing system which provides attitude and heading information. In some embodiments, AHRS 124 may provide attitude determination of UAV 100, and form part of an inertial navigation system of UAV 100.

Communication unit 126 may include a modem for transmitting and receiving radio frequency signals through antenna 125 and communicating with GCS 700. Communication unit 126 can include one or more cellular communication modules, including, for example, an IEEE 802.11, a fifth generation (5G) radio system, a Long-Term Evolution (LTE), a High Speed Packet Access (HSPA), a Wideband Code-Division Multiple Access (WCDMA), and/or a Global System for Mobile communication (GSM) communication module. UAV 100 can be configured to communicate with GCS 700 through communication unit 126 and antenna 125. Communication unit 126 may also include a global positioning system (GPS) receiver. Accordingly, UAV 100 can receive positioning information through the GPS receiver of communication unit 126.

Communication unit 126 may include any appropriate type of hardware, such as integrated circuits and field programmable gate arrays, or software, such as a set of instructions, a subroutine, or a function (i.e. a functional program) executable on a processor or controller, to carry out the following communication operations. Communication unit 126 includes modulation and demodulation subunits (i.e., a modem) that modulate and demodulate electric or radio signals for data transmission and reception. For example, communication unit 126 may include a Wi-Fi modem that transmits and receives data to and from GCS 700 through a Wi-Fi Direct technology. As another example, communication unit 126 includes a long-term evolution (LTE) modem that transmits and receives data to and from GCS 700 through an LTE Device-to-Device technology. In certain applications, communication unit 126 may employ infrared technology.

FIG. 7 is a schematic diagram of an exemplary GCS 700, according to some embodiments of the present disclosure. GCS 700 includes a memory 710, a processor 720, an I/O interface 730, and a flight control module 740. As shown in FIG. 7, flight control module 740 includes a controller 742, a communication unit 744, and an antenna 746, although this is just one exemplary embodiment. One or more of controller 742, a communication unit 744, and an antenna 746 may be present in GCS 700 but not part of flight control module 740. These units may be configured to transfer data and send or receive instructions between or among each other.

Processor 720 includes any appropriate type of general-purpose or special-purpose microprocessor, digital signal processor, or microcontroller. Processor 720 can be one or more processors in a computer. Memory 710 may include any appropriate type of storage provided to store any type of information that processor 720 may need to operate. Memory 710 may be a volatile or non-volatile, magnetic, semiconductor, tape, optical, removable, non-removable, or other type of storage device or tangible (e.g., non-transitory) computer-readable medium including, but not limited to, a read-only memory (ROM), a flash memory, a dynamic random-access memory (RAM), and a static RAM. Memory 710 may be configured to store one or more programs or instructions for execution by processor 720 to control UAV 100, as disclosed herein. Processor 720 can be configured to cause GCS 700 as the GCS described above for FIGS. 1-4.

Memory 710 may be further configured to store information and data used by processor 720. For instance, memory 710 can be configured to store a home point, a landing point, previous routes, previous missions, photographs, and location information associated with photographs.

I/O interface 730 can be configured to communicate with other apparatuses. For example, I/O interface 730 may receive a signal from another apparatus (e.g., a computer) including system configuration for GCS 700. I/O interface 730 may also output data of flight routes and photographs.

Controller 742 includes any appropriate type of general-purpose or special-purpose microprocessor, digital signal processor, or microcontroller. Controller 742 is configured to execute instructions to cause flight control module 740 to communicate with FCS 120 through communication unit 744 and antenna 746.

Communication unit 744 can include one or more cellular communication modules, including, for example, an IEEE 802.11, a fifth generation (5G) radio system, a Long-Term Evolution (LTE), a High Speed Packet Access (HSPA), a Wideband Code-Division Multiple Access (WCDMA), and/or a Global System for Mobile communication (GSM) communication module. GCS 700 can communicate with UAV 100 through communication unit 744 and antenna 746. Communication unit 744 may also include a global positioning system (GPS) receiver. Accordingly, GCS 700 can receive positioning information through the GPS receiver of communication unit 744.

Figure 8:
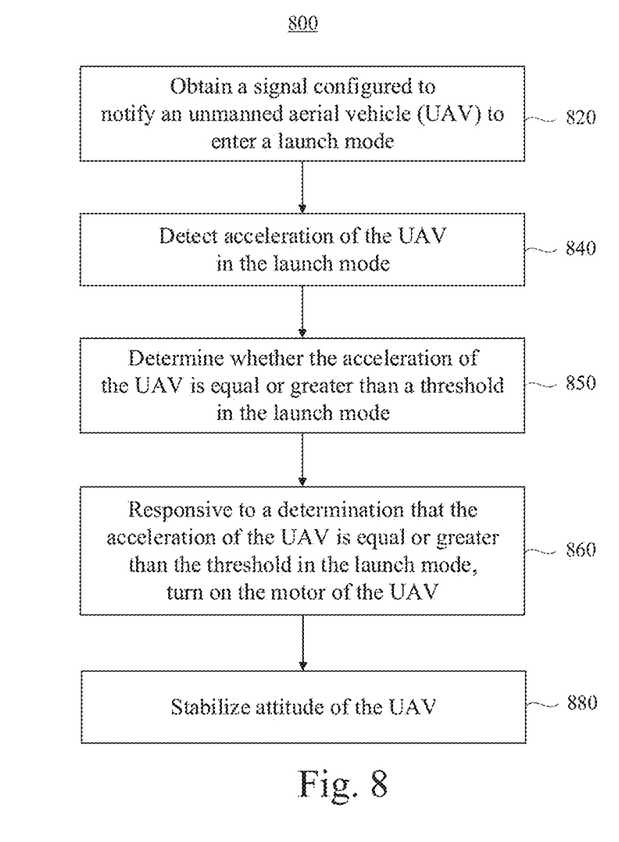
FIG. 8 is a schematic diagram of an exemplary method for launching a UAV, according to some embodiments of the present disclosure.

FIG. 8 is a schematic diagram of an exemplary method 800 for launching a UAV, according to some embodiments of the present disclosure. Method 800 may be performed by, for example, FCC 122 of UAV 100. Processor 122-1 of FCC 122 may be configured to execute instructions to perform method 800, as illustrated below. Method 800 includes obtaining a signal configured to notify a UAV to enter a launch mode (step 820), detecting acceleration of the UAV in the launch mode (step 840), determining whether the acceleration of the UAV is equal to or greater than a threshold in the launch mode (step 850), and responsive to a determination that the acceleration of the UAV is equal to or greater than the threshold, turning on the motor of the UAV (step 860). After turning on the motor of the UAV 100 for launching, method 800 may also include stabilizing attitude of the UAV (step 880).

Step 820 includes obtaining a signal configured to notify a UAV to enter a launch mode. For example, as shown in FIGS. 1 and 2 and illustrated in their descriptions, the user may unlock the motor of UAV 100 to active UAV 100 in the launch mode (i.e., the take-off mode) by tilting up over the degree φ or sending a signal for take-off from the GCS. The signal is configured to notify UAV 100 to enter the launch mode.

Step 840 includes detecting acceleration of the UAV in the launch mode. For example, the user may unlock motor 150 of UAV 100 before the user throws UAV 100 into the air. After UAV 100 is thrown into the air, detector 123 of AHRS 124 is configured to detect or measure the acceleration of UAV 100 and send the detected acceleration of UAV 100 to FCC 122 as described above for FIG. 5.

Step 850 includes determining whether the acceleration of the UAV is equal to or greater than a threshold in the launch mode. For example, FCC 122 may be configured to receive the detected acceleration of UAV 100 from AHRS 124 and determine whether the received acceleration of UAV 100 is equal or greater than a threshold, such as three, four, five times of gravitational acceleration (g). As an example, when the threshold is set as five times of gravitational acceleration (i.e., 5 g) and FCC 122 receives six times of gravitational acceleration (i.e., 6 g) from detector 123 of AHRS 124, FCC 122 is configured to determine that the acceleration of UAV 100 is greater than the threshold.

In contrast, when the threshold is set as five times of gravitational acceleration (i.e., 5 g) and FCC 122 receives three times of gravitational acceleration (i.e., 3 g) from detector 123 of AHRS 124, FCC 122 is configured to determine that the acceleration of UAV 100 is not equal to or greater than the threshold.

Step 860 includes responsive to a determination that the acceleration of the UAV is equal to or greater than the threshold, turning on the motor of the UAV. For example, when FCC 122 determines that the acceleration of UAV 100 is greater than the threshold, FCC 122 is configured to turn on motor 150 of UAV 100 to spin propeller 130. Spinning propeller 130 can produce thrust for UAV 100 to fly. In some embodiments, FCC 122 is configured to turn on motor 150 of UAV 100 to spin propeller 130 at full throttle for takeoff. For example, when UAV 100 is launched, FCC 122 is configured to turn on motor 150 of UAV 100 to spin propeller 130 at full throttle.

Step 880 includes stabilizing attitude of the UAV. For example, FCC 122 is configured to stabilize attitude of UAV 100 after turning on motor 150 of UAV 100 for launching. FCC 122 can be configured to control an elevation angle of UAV 100 at an angle, e.g., 30 degrees, to climb to a higher position in the sky. FCC 122 can also be configured to control the elevation angle of UAV 100 by adjusting two ailerons 173 and 174 of UAV 100, as described above for FIG. 3. In some embodiments, FCC 122 is configured to balance UAV 100 by adjusting two ailerons 173 and 174 of UAV 100, as described above or FIG. 3.

In some embodiments, method 800 can further include other steps implementing those operations the system or UAV 100 described above in FIGS. 1-4.

Figure 9A:
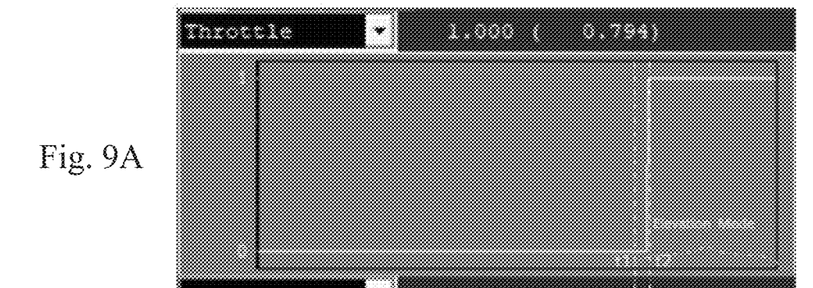
FIG. 9A is an exemplary diagram of throttle status for launching a UAV through a launch mode and an elevation mode, according to some embodiments of the present disclosure.

FIG. 9A is an exemplary diagram of throttle status for launching a UAV through a launch mode and an elevation mode, according to some embodiments of the present disclosure. FIG. 9A shows changes of throttle when UAV 100 is launched. As shown in FIG. 9A, when a system for launching UAV 100 detects acceleration of UAV 100 that is equal to or greater than a threshold, the system is configured to control motor 150 at full throttle, i.e., "1" shown in FIG. 9A. Afterward, UAV 100 is configured to enter an elevation mode, and motor 150 is still at full throttle for takeoff.

Figure 9B:
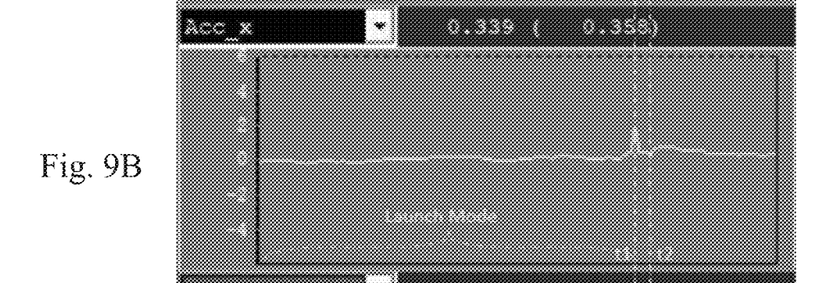
FIG. 9B is an exemplary diagram of acceleration of a UAV for launching a UAV through a launch mode and an elevation mode, according to some embodiments of the present disclosure.

FIG. 9B is an exemplary diagram of acceleration of a UAV for launching a UAV through a launch mode and an elevation mode, according to some embodiments of the present disclosure. FIG. 9B shows detected acceleration Acc of UAV 100. For example, when user 300 throws UAV 100 upward into the air, detector 123 detects the acceleration of UAV, as shown in FIG. 9B. When the system for launching UAV 100 determines that the acceleration is greater than a threshold, the system is configured to control motor 150 at full throttle immediately, as shown in FIG. 9A.

Figure 9C:
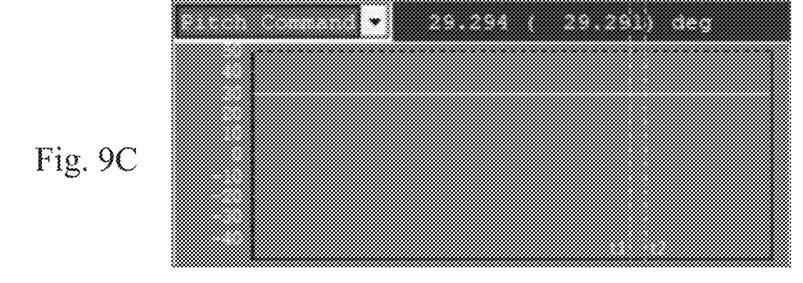
FIG. 9C is an exemplary diagram of a pitch command for launching a UAV through a launch mode and an elevation mode, according to some embodiments of the present disclosure.

FIG. 9C is an exemplary diagram of a pitch command for launching a UAV through a launch mode and an elevation mode, according to some embodiments of the present disclosure. FIG. 9C shows that a pitch command is kept to instruct UAV 100 with an elevation angle of 30 degrees over the launch mode and the elevation mode.

As shown in FIG. 9B, UAV 100 is set in the launch mode at t=0. Detector 123 of UAV 100 is activated to detect acceleration of UAV 100. When user 300 throws UAV 100 as shown in FIG. 3 or UAV 100 is ejected from launch rack 200, the acceleration of UAV 100 increase extremely in a short period of time. At t=t1, the acceleration of UAV 100 achieves a peak value. If the peak value is equal to or greater than a predetermined threshold, the system for launching UAV 100 is configured to start motor 150. When t=t2, motor 150 is at full throttle, as shown in FIG. 9A.

As shown in FIGS. 9A and 9B, during t1<t<t2, since the force from hand or launch rack 200 is no longer exerted on UAV 100, the acceleration of UAV 100 decreases. When t=t2, motor 150 is at full throttle that produces maximum thrust for UAV 100. Accordingly, the acceleration of UAV 100 increases to a higher level than that during 0<t<t1. When t≥t2, UAV 100 enters the elevation mode. In the elevation mode, as shown in FIG. 9C, the elevation angle is maintained at 30 degrees by the system for launching UAV 100.

The disclosure is also directed to systems for launching a UAV. For example, exemplary systems include FCC 122, AHRS 124, communication unit 126, and antenna 125. Detector 123 of AHRS 124 is configured to detect an acceleration of UAV 100. The system may also include a memory storing instructions. For example, memory 122-2 of FCC 122 is configured to store instructions in accordance with method 800. The system can also include a processor configured to execute the instructions to: determine whether the acceleration of the UAV is equal or greater than a threshold in the launch mode, and responsive to the determination that the acceleration of the UAV is equal or greater than the threshold in the launch mode, turn on a motor of the UAV. For example, processor 122-1 of FCC 122 is configured to execute the instructions to determine whether the acceleration of UAV 100 is equal to or greater than a threshold in the launch mode, and responsive to the determination that the acceleration of UAV 100 is equal or greater than the threshold in the launch mode, turn on motor 150 of UAV 100. In some embodiments, the system is configured to perform one or more of the steps of method 800 shown in FIG. 8 and illustrated in its descriptions. Alternatively, the system can also be configured to perform one or more operations described above in FIGS. 1-4.

Another aspect of the disclosure is directed to a non-transitory computer-readable medium storing a set of instructions that is executable by one or more processors of an apparatus to cause the apparatus to perform a method for launching a UAV, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. A system for launching an unmanned aerial vehicle (UAV), the system comprising:
   a detector configured to detect acceleration of the UAV in a launch mode;
   a memory storing instructions;
   a processor configured to execute the instructions to cause the system to:
      obtain a signal configured to notify the UAV to enter the launch mode;
      determine whether the acceleration of the UAV satisfies a condition corresponding to threshold acceleration in the launch mode; and
      responsive to the determination that the acceleration of the UAV satisfies the condition, turn on a motor of the UAV at full throttle.

2. The system of claim 1, wherein the condition is satisfied when the acceleration of the UAV is equal to or greater than the threshold acceleration.

3. The system of claim 2, wherein the threshold acceleration is five times of gravitational acceleration.

4. The system of claim 1, wherein the processor is further configured to execute the instructions to cause the system to stabilize attitude of the UAV after turning on the motor of the UAV.

5. The system of claim 4, wherein the processor is configured to execute the instructions to cause the system to control an elevation angle of the UAV to stabilize the attitude of the UAV.

6. The system of claim 5, wherein the elevation angle is equal to or greater than 30 degrees.

7. The system of claim 4, wherein the processor is configured to execute the instructions to cause the system to adjust two ailerons of the UAV to stabilize the attitude of the UAV.

8. The system of claim 1, wherein the processor is configured to execute the instructions to cause the system to obtain the signal configured to notify the UAV to enter the launch mode by:
   detecting whether the UAV is tilted up over an unlock angle, and responsive to a determination that the UAV is tilted up over the unlock angle, entering the launch mode.

9. A non-transitory computer-readable medium storing a set of instructions that is executable by one or more processors of an apparatus to cause the apparatus to perform a method for launching an unmanned aerial vehicle (UAV), the method comprising:
   obtaining a signal configured to notify the UAV to enter a launch mode;
   detecting acceleration of the UAV in the launch mode;
   determining whether the acceleration of the UAV satisfies a condition corresponding to threshold acceleration in the launch mode; and responsive to the determination that the acceleration of the UAV satisfies the condition, turning on a motor of the UAV at full throttle.

10. The non-transitory computer-readable medium of claim 9, wherein the condition is satisfied when the acceleration of the UAV is equal to or greater than the threshold acceleration.

11. The non-transitory computer-readable medium of claim 10, wherein the threshold acceleration is five times of gravitational acceleration.

12. The non-transitory computer-readable medium of claim 9, wherein the method further comprises:
stabilizing attitude of the UAV after turning on the motor of the UAV.

13. The non-transitory computer-readable medium of claim 12, wherein stabilizing attitude of the UAV includes:
controlling an elevation angle of the UAV.

14. The non-transitory computer-readable medium of claim 13, wherein the elevation angle is equal or greater than 30 degrees.

15. The non-transitory computer-readable medium of claim 12, wherein stabilizing attitude of the UAV includes:
adjusting two ailerons of the UAV.

16. The non-transitory computer-readable medium of claim 9, wherein obtaining the signal configured to notify the UAV to enter the launch mode includes:
detecting whether the UAV is tilted up over an unlock angle, and responsive to a determination that the UAV is tilted up over the angle, entering the launch mode.

17. A method for launching an unmanned aerial vehicle (UAV), the method comprising:
obtaining a signal configured to notify the UAV to enter a launch mode;
detecting an acceleration of the UAV in the launch mode;
determining whether the acceleration of the UAV is equal to or greater than a threshold in the launch mode; and
responsive to a determination that the acceleration of the UAV is equal to or greater than the threshold in the launch mode, turning on a motor of the UAV at full throttle.

18. The method of claim 17, further comprising:
stabilizing attitude of the UAV after turning on the motor of the UAV.

* * * * *